US012596700B2

(12) United States Patent
Samwel et al.

(10) Patent No.: US 12,596,700 B2
(45) Date of Patent: *Apr. 7, 2026

(54) CONCURRENT OPTIMISTIC TRANSACTIONS FOR TABLES WITH DELETION VECTORS

(71) Applicant: Databricks, Inc., San Francisco, CA (US)

(72) Inventors: Bart Samwel, Oegstgeest (NL); Christos Stavrakakis, Berlin (DE)

(73) Assignee: Databricks, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/928,982

(22) Filed: Oct. 28, 2024

(65) Prior Publication Data

US 2025/0103580 A1 Mar. 27, 2025

Related U.S. Application Data

(63) Continuation of application No. 18/156,109, filed on Jan. 18, 2023, now Pat. No. 12,147,412.

(30) Foreign Application Priority Data

Jan. 13, 2023 (GR) .............................. 20230100021

(51) Int. Cl.
*G06F 16/00* (2019.01)
*G06F 16/23* (2019.01)
(52) U.S. Cl.
CPC ...... *G06F 16/2315* (2019.01); *G06F 16/2358* (2019.01); *G06F 16/2379* (2019.01)
(58) Field of Classification Search
CPC ............. G06F 16/2379; G06F 16/2358; G06F 16/2343; G06F 16/2282; G06F 16/2308; G06F 16/2365; G06F 16/284; G06F 16/2315; G06F 16/24568; G06F 16/273; G06F 21/6218; G06F 11/0709; G06F 11/0751; G06F 11/0766; G06F 11/0772;

(Continued)

(56) References Cited

U.S. PATENT DOCUMENTS

2017/0277744 A1* 9/2017 Mohandas .......... G06F 16/2365
2023/0055715 A1* 2/2023 Luo ..................... G06F 16/2379

OTHER PUBLICATIONS

United States Office Action, U.S. Appl. No. 18/156,109, filed Feb. 1, 2024, 15 pages.

* cited by examiner

*Primary Examiner* — Shyue Jiunn Hwa
(74) *Attorney, Agent, or Firm* — Fenwick & West LLP

(57) ABSTRACT

A disclosed configuration receives a first indication that a first transaction is committed to update a first subset of records in a data table at a first version to generate a second version of the data table and receiving a second indication to commit a second transaction to update a second subset of records in a data file of the data table at the first version. The configuration determines a logical prerequisite based on whether the first subset of records changes content of one or more records in the second subset of records and determining a physical prerequisite on whether the second subset of records corresponds to respective data records in data files of the second version of the data table. The configuration commits the second transaction to generate a third version of the data table by updating elements of the deletion vector if the prerequisites are satisfied.

18 Claims, 10 Drawing Sheets

(58) Field of Classification Search
CPC .. G06F 11/0793; G06F 21/552; G06F 21/604;
G06F 21/6227; G06F 16/13; G06F
16/168; G06F 16/1734; G06F 21/6245;
G06F 21/64; G06F 2221/2101; G06F
2221/2141; G06F 30/13; G06F 40/197;
H04L 63/08; H04L 63/0823; H04L 63/10;
H04L 63/105; H04L 67/1097; H04L
9/088; H04L 9/0891; H04L 9/0894; H04L
9/3247
See application file for complete search history.

100

Version 1 410

| Row | Account | Login? | Date | DV |
|-----|---------|--------|------|-----|
| 1 | alex@domain | TRUE | 2022-1-12 | 0 |
| 2 | joe@domain | FALSE | 2020-5-1 | 0 |
| 3 | sam@domain | TRUE | 2021-11-13 | 0 |

Deletion Vector 450

Data File 400

Transaction 415

Version 2 420

| Row | Account | Login? | Date | DV |
|-----|---------|--------|------|-----|
| 1 | alex@domain | TRUE | 2022-1-12 | 0 |
| 2 | joe@domain | FALSE | 2020-5-1 | 1 |
| 3 | sam@domain | TRUE | 2021-11-13 | 0 |

V1 410 → Transaction 415 → V2 420

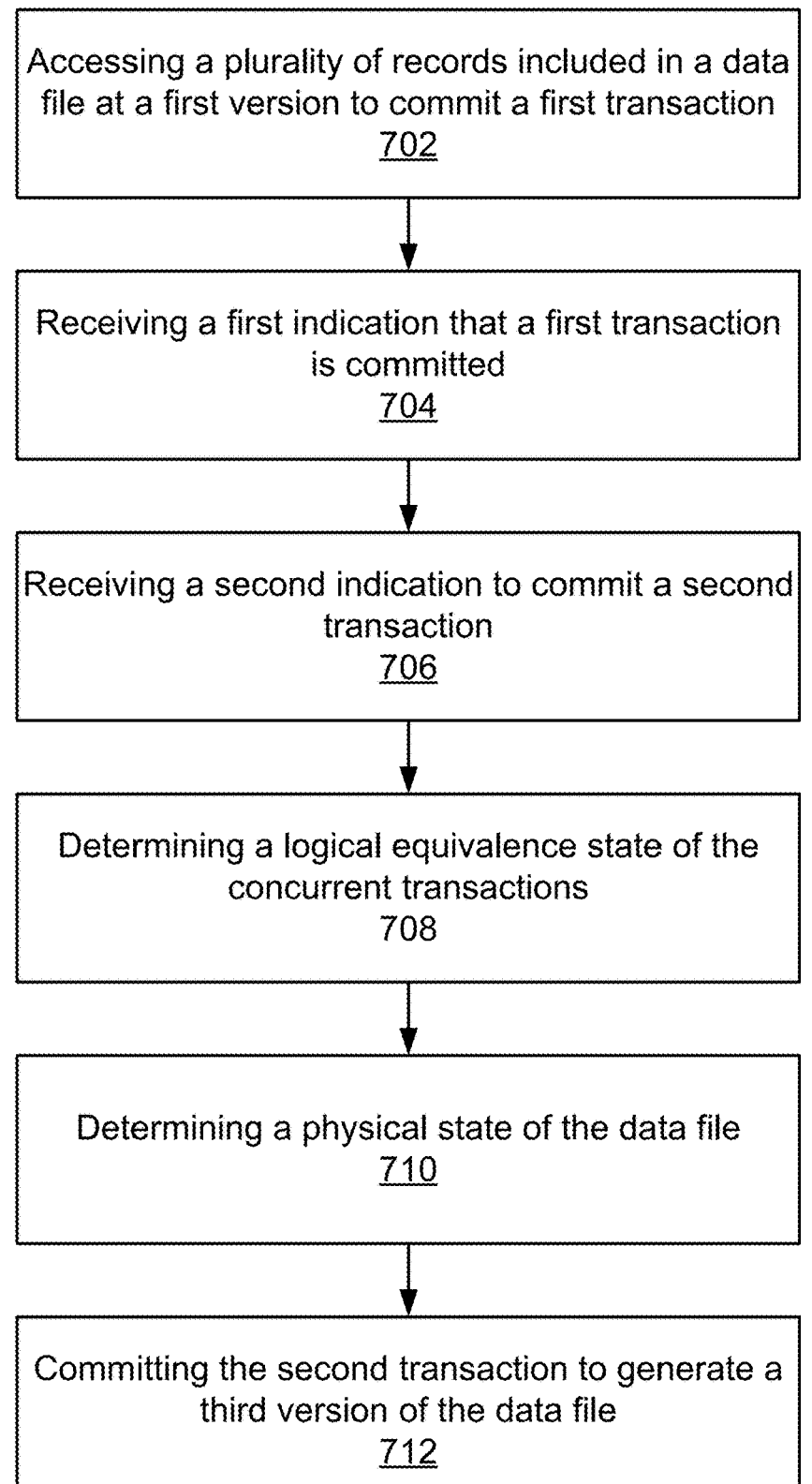

Accessing a plurality of records included in a data file at a first version to commit a first transaction
702

Receiving a first indication that a first transaction is committed
704

Receiving a second indication to commit a second transaction
706

Determining a logical equivalence state of the concurrent transactions
708

Determining a physical state of the data file
710

Committing the second transaction to generate a third version of the data file
712

CONCURRENT OPTIMISTIC TRANSACTIONS FOR TABLES WITH DELETION VECTORS

CROSS REFERENCE TO RELATED APPLICATIONS

This application is a continuation of prior, co-pending U.S. application Ser. No. 18/156,109, filed on Jan. 18, 2023, which claims priority to Greek Application No: 20230100021, filed on Jan. 13, 2023, both of which are incorporated herein by reference in their entirety for all purposes.

TECHNICAL FIELD

This disclosure relates generally to data storage technologies, and more particularly to a method and system for committing concurrent transactions using deletion vectors.

BACKGROUND

A data processing service may manage a significant amount of data for one or more entities in various forms, such as raw data or data tables. Oftentimes, the data tables have to be modified or updated by users (e.g., data analysts) associated with these entities. A transaction may result in incremental changes to the data table and may commit a new version reflecting these changes. For example, a transaction may add a data file and remove another data file. As another example, a transaction may add a column to the schema of the data table.

Moreover, a data processing system may include large file repositories and users may request transaction operations through multiple independent systems. Multiple transactions may be performed and attempt to update a same data file at a certain version at the same time. One transaction may commit first (e.g., winning transaction) and the other transaction may have not committed yet (e.g., current transaction). For example, the winning transaction may have added new files with replacement data and committed changes while the current transactions attempt to read and write the same data table. The current transaction might not be able to write because it did not consider the added file introduced by the winning transaction, and the current transaction has to abort. In such cases, aborting a transaction due to concurrent transactions is a significant waste of time and resources.

BRIEF DESCRIPTION OF THE DRAWINGS

The disclosed embodiments have other advantages and features which will be more readily apparent from the detailed description, the appended claims, and the accompanying figures (or drawings). A brief introduction of the figures is below.

FIG. 7 is a flowchart of a method for committing one or more concurrent transactions, in accordance with an embodiment.

FIG. 8 is a block diagram illustrating an example machine to read and execute computer readable instructions, in accordance with an embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

The disclosed configurations beneficially provide a method (and/or a system) for resolving concurrent transactions using deletion vectors. Use of deletion vectors, addresses shortcomings in current systems in which significant number of concurrent transactions fail due to intervening transactions having altered the physical representation of the data table. By resolving concurrent conflicts in conjunction with deletion vectors associated with data files, the techniques presented herein may determine a logical prerequisite of the concurrent transactions and a physical prerequisite of the data file. In this way, the techniques presented herein determine the serializability of the concurrent transactions and prevent many transaction operations from failing and having to be repeated, thereby increasing the perceived computational speed in performing transactions, as well as reducing computing resource usage and cost for both the data processing service and the users of the data processing service.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Overview

Figure 1:
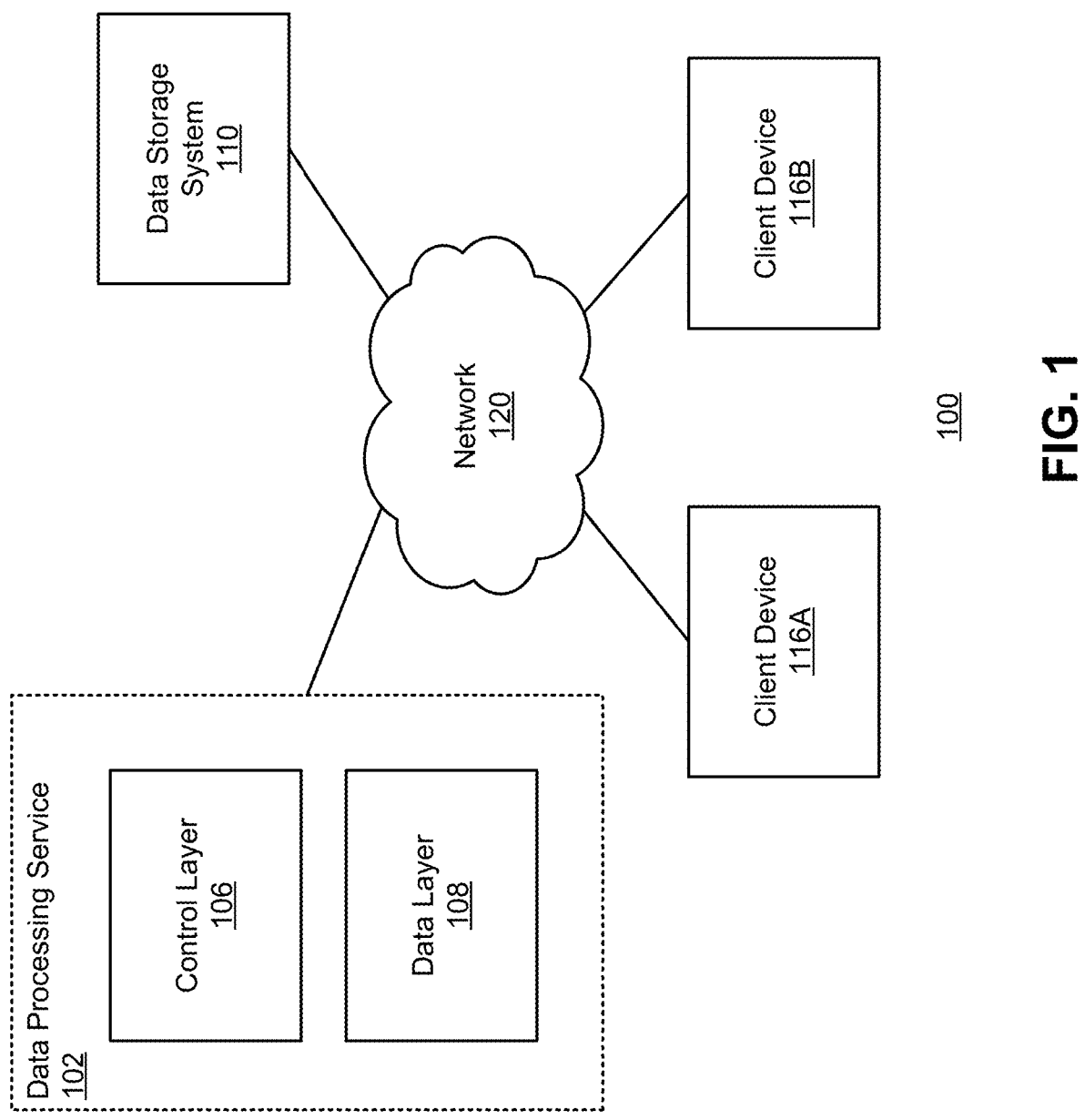
FIG. 1 is a high-level block diagram of a system environment for a data processing system, in accordance with an embodiment.

FIG. 1 is a high-level block diagram of a system environment 100 for a data processing service 102, in accordance with an embodiment. The system environment 100 shown by FIG. 1 includes one or more client devices, e.g., 116A, 116B (generally 116), a network 120, a data processing service 102, and a data storage system 110. In alternative configurations, different and/or additional components may be included in the system environment 100.

The data processing service 102 is a service for managing and coordinating data processing services to users of client devices 116. The data processing service 102 may manage one or more applications that users of client devices 116 can use to communicate with the data processing service 102. Through an application of the data processing service 102, the data processing system 102 may receive requests from users of client devices 116 to perform one or more data processing functionalities on data stored, for example, in the data storage system 110. The requests may include query requests, analytics requests, or machine learning and artificial intelligence requests, and the like, on data stored in the data storage system 110. The data processing service 102 may provide responses to the requests to the users of the client devices 116 after they have been processed.

In one embodiment, as shown in the system environment 100 of FIG. 1, the data processing service 102 includes a control layer 106 and a data layer 108. The components of the data processing service 102 may be configured on one or more servers and/or a cloud infrastructure platform. In one embodiment, the control layer 106 receives data processing requests and coordinates with the data layer 108 to process the requests from client devices 116. The control layer 106 may schedule one or more jobs related to a request or receive requests to execute one or more jobs from the user directly through a respective client device 116. The control layer 106 may distribute the jobs to components of the data layer 108 where the jobs are executed.

As described in detail below, in one embodiment, the control layer 106 provides a method and instructions by which concurrent transaction operations to a data table can be resolved in conjunction with deletion vectors associated with data files of the data table. One or more changes to a data table may be part of a "transaction." A deletion vector is a metadata structure associated with a data file of a data table. Each element in the deletion vector includes an indication whether a corresponding record in the data file is valid or not. For example, each element in the deletion vector indicates whether the corresponding record in the data file is present and unmodified in the data file or has been modified or deleted from the data file. In some embodiments, an element of the deletion vector has a positive indication (e.g., positive value) when the respective record has been deleted or is modified (e.g., the record has been deleted and a new record that is an updated record is appended to the data table) and has a neutral or negative indication (e.g., zero or negative value) when the respective record is present and unmodified.

In some embodiments, the control layer 106 determines, for a current transaction, whether any intervening transactions that have been successfully committed have logically changed the subset of records of interest to the current transaction. The control layer 106 also determines, for the current transaction, whether the current transaction can locate the subset of records of interest after the intervening transactions have been committed. In some embodiments, the subset of records are records that the current transaction attempts to delete or update. Responsive to determining that both conditions are satisfied (e.g., one or more intervening transactions logically changing the subset of records have been committed and the current transaction can locate the subset of records of interest after the intervening transactions have been committed), the control layer 106 may proceed with committing the current transaction to a new version of the data table by indicating the elements in the deletion vectors that correspond to the records to be deleted or updated for the current transaction.

Use of deletion vectors, addresses shortcomings in current systems in which significant number of concurrent transactions fail due to intervening transactions having altered the physical representation of the data table. Without use of deletion vectors, current transactions typically have to be repeated on the most current version of the data table, resulting in wasted computing resources and time especially for data tables that have a significant number (e.g., millions) of records. By resolving concurrent conflicts in conjunction with deletion vectors associated with data files, the control layer 106 may prevent many transaction operations from failing and thereby eliminate the need to repeat these transaction operations. As a result, the number of transaction operations performed is significantly reduced, thereby lowering resource usage and cost for both the data processing service 102 and the users of the data processing service 102.

The control layer 106 is additionally capable of configuring the clusters in the data layer 108 that are used for executing the requests. For example, a user of a client device 116 may submit a request to perform one or more query operations and may specify that four clusters on the data layer 108 be activated to process the request with certain memory requirements. Responsive to receiving this information, the control layer 106 may send instructions to the data layer 108 to activate the requested number of clusters and configure the clusters according to the requested memory requirements.

The data layer 108 includes multiple instances of clusters of computing resources that execute one or more jobs received from the control layer 106. In one instance, the clusters of computing resources are virtual machines or virtual data centers configured on a cloud infrastructure platform. In one instance, the data layer 108 is configured as a multi-tenant architecture where a plurality of data layer instances process data pertaining to various tenants of the data processing service 102. For example, a respective data layer instance can be implemented for each respective tenant. However, it is appreciated that in other embodiments, the data layer 108 can be configured as a single tenant architecture.

The data layer 108 thus may be accessed by, for example, a developer through an application of the control layer 106 to execute code developed by the developer. In one embodiment, a cluster in a data layer 108 may include multiple worker nodes that execute multiple jobs in parallel. Responsive to receiving a request, the data layer 108 divides the cluster computing job into a set of worker jobs, provides each of the worker jobs to a worker node, receives worker job results, stores job results, and the like. The data layer 108 may include resources not available to a developer on a local development system, such as powerful computing resources to process very large data sets. In this manner, when the data processing request can be divided into jobs that can be executed in parallel, the data processing request can be processed and handled more efficiently with shorter response and processing time.

The data storage system 110 includes a device (e.g., a disc drive, a hard drive, a semiconductor memory) used for storing database data (e.g., a stored data set, portion of a stored data set, data for executing a query). In one embodiment, the data storage system 110 includes a distributed storage system for storing data and may include a commercially provided distributed storage system service. Thus, the data storage system 110 may be managed by a separate entity than an entity that manages the data processing service 102 or the data storage system 110 may be managed by the same entity that manages the data processing service 102.

The client devices 116 are computing devices that may provide for display of information to users and communicate user actions to the systems of the system environment 100. While two client devices 116A, 116B are illustrated in FIG. 1, in practice many client devices 116 may communicate with the systems of the system environment 100. In one embodiment, a client device 116 is a conventional computer system, such as a desktop or laptop computer. Alternatively, a client device 116 may be a device having computer functionality, such as a personal digital assistant (PDA), a mobile telephone, a smartphone or another suitable device. A client device 116 is configured to communicate via the network 120, which may comprise any combination of local area and/or wide area networks, using both wired and/or wireless communication systems.

In one example embodiment, a client device 116 executes an application allowing a user of the client device 116 to interact with the various systems of the system environment 100 of FIG. 1. For example, a client device 116 can execute a browser application to enable interaction between the client device 116 and the data processing service 102 via the network 120. In another embodiment, the client device 116 interacts with the various systems of the system environment 100 through an application programming interface (API) running on a native operating system of the client device 116, such as IOS® or ANDROID™.

Figure 2:
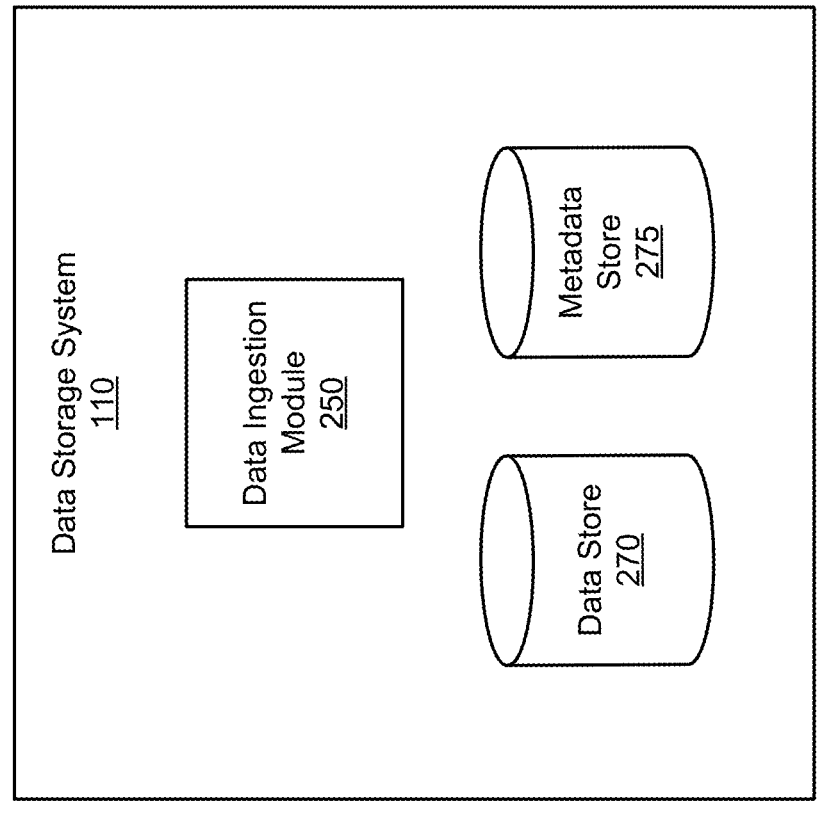
FIG. 2 illustrates a block diagram of an architecture of the data processing system, in accordance with an embodiment.

Turning now to FIG. 2, illustrated is a block diagram of an architecture of a data storage system 110, in accordance with some example embodiments. As shown in FIG. 2, the data storage system 110 includes a data ingestion module 250, a data store 270, and a metadata store 275. The data ingestion module 250 ingests various forms of data into the data storage system 110. The data ingestion module 250 may ingest data from one or more external sources. For example, a tenant may store data across various data sources, such as different databases or product applications, and it may be advantageous to gather the data into the data storage system 110 for further data processing and analytics. In one instance, the data sources are third-party sources, and the data ingestion module 250 may ingest data from these sources using connectors. The data ingestion module 250 may ingest data in discrete batches, or may continuously ingest data as new data becomes available in these sources.

The data store 270 stores data associated with different tenants of the data processing service 102. In some embodiments, the data in data store 270 is stored in a format of a data table. A data table may include a plurality of records or instances, where each record may include values for one or more features. Each feature may represent a measurable piece of data that can be used for analysis, such as, login account, timestep, etc. In some embodiments, a feature may refer to any characteristic of the data that can be associated with one or more values. The records may span across multiple rows of the data table and the features may span across multiple columns of the data table. In other embodiments, the records may span across multiple columns and the features may span across multiple rows. For example, a data table associated with a security company may include a plurality of records each corresponding to a login instance of a respective user to a website, where each record includes values for a set of features including user login account, timestamp of attempted login, whether the login was successful, and the like. In one embodiment, the plurality of records of a data table may span across one or more data files. For example, a first subset of records for a data table may be included in a first data file and a second subset of records for the same data table may be included in another second data file.

In one embodiment, a data table may be stored in the data store 270 in conjunction with metadata stored in the metadata store 275. In one instance, the metadata includes transaction logs for data tables. Specifically, a transaction log for a respective data table is a log recording a sequence of transactions that were performed on the data table. A transaction may perform one or more changes to the data table that may include removal, modification, and/or addition of records and features to the data table, and the like. For example, a transaction may be initiated responsive to a request from a user of the client device 116. As another example, a transaction may be initiated according to policies of the data processing service 102. Thus, a transaction may write one or more changes to data tables stored in the data storage system 110.

In one embodiment, a new version of the data table is committed when changes of a respective transaction are successfully applied to the data table of the data storage system 110, and the commit is indicated in the transaction log for a data table. Since a transaction may remove, modify, or add data files to the data table, a particular version of the data table in the transaction log may be defined with respect to the set of data files for the data table. For example, a first transaction may have created a first version of a data table defined by data files A and B each having information for a respective subset of records of the data table. A second transaction may have subsequently created a second version of the data table defined by data files A, B, and new data file C, which include another respective subset of records (e.g., new appended records) of the data table.

In one embodiment, the transaction log may record each version of the table, the data files associated with a respective version of the data table, information pertaining to the type of transactions that were performed on the data table, the order in which the transactions were performed (e.g., transaction sequence number, a timestamp of the transaction), and an indication of data files that were subject to the transaction, and the like. In some embodiments, the transaction log may include change data for a transaction that also records the changes written into a data table with respect to the previous version of the data table. The change data may be at a relatively high level of granularity in that the change data indicates the specific changes to individual records with an indication of whether the record was inserted, deleted, or updated due to the corresponding transaction.

Figure 3:
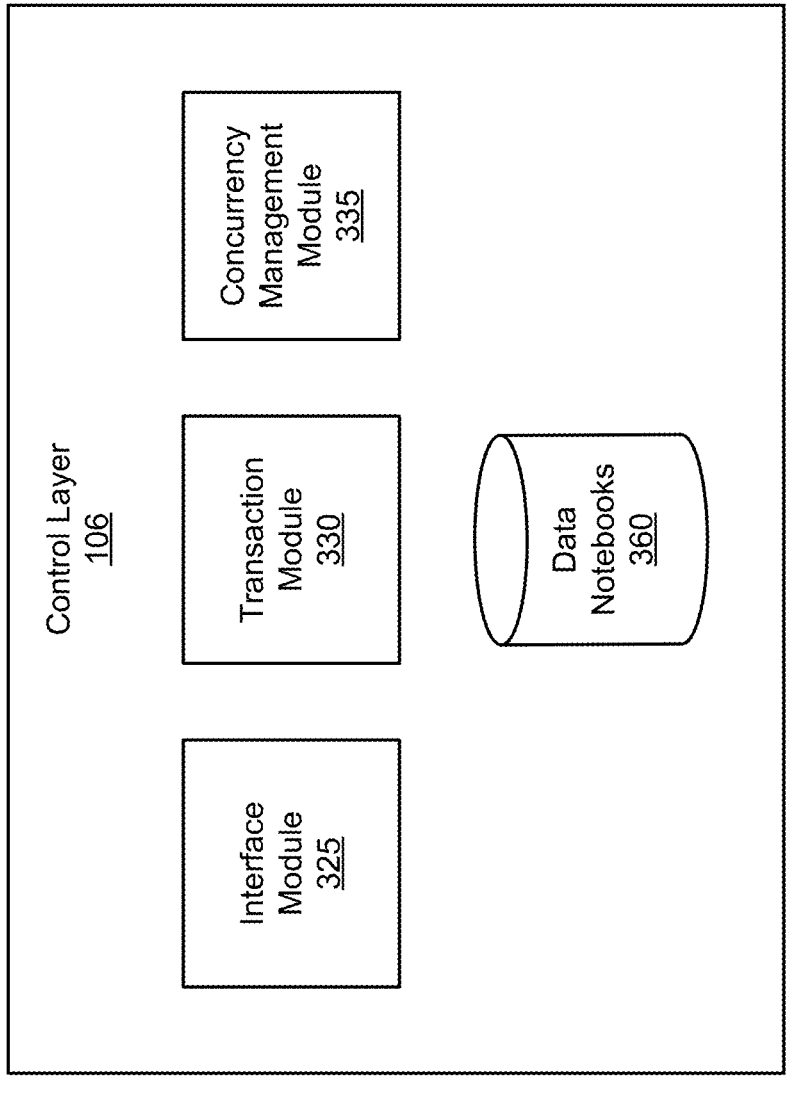
FIG. 3 is a block diagram of an architecture of a control layer, in accordance with an embodiment.

Referring now to FIG. 3, illustrated is a block diagram of an architecture of a control layer 106, in accordance with some example embodiments. As shown, the control layer 106 includes an interface module 325, a transaction module 330, a concurrency management module 335, and a data notebook 360.

The interface module 325 provides an interface and/or a workspace environment where users of client devices 116 (e.g., users associated with tenants) can access resources of the data processing service 102. For example, the user may retrieve information from data tables associated with a tenant and submit data processing requests, such as query requests on the data tables, through the interface provided by the interface module 325. The interface provided by the interface module 325 may include electronic notebooks, libraries, experiments (e.g., data and/or analysis), and/or queries submitted by the user. In some embodiments, a user may access the workspace via a user interface (UI), a command line interface (CLI), and/or through an application programming interface (API) provided by the interface module 325.

In some embodiments, a notebook associated with a workspace environment is a web-based interface to a document that includes runnable code, visualizations, and explanatory text. A user may submit data processing requests on data tables in the form of one or more notebook jobs. The user provides code for executing the one or more jobs and indications such as the desired time for execution, number of cluster worker nodes for the jobs, cluster configurations, a notebook version, input parameters, authentication information, output storage locations, or any other type of indications for executing the jobs. The user may also view or obtain results of executing the jobs via the workspace.

The transaction module 330 receives requests to perform one or more transaction operations from users of client devices 116 to manage data tables. As described in conjunction in FIG. 2, a request to perform a transaction operation may represent one or more changes to the data table. For example, the transaction may be to insert new records into a data table, replace existing records in the data table, delete records in the data table, and the like. As another example, the transaction may be to rearrange or reorganize the records or the data files of a data table to, for example, improve the speed of operations such as queries on the data table or for ease of management. For instance, when a particular version of a data table has a significant number of data files composing the data table, some operations may be relatively inefficient. Thus, one type of transaction operation may be a compaction operation that combines the records included in one or more data files into a single data file.

Upon receiving a request to perform a transaction operation on a data table, the transaction module 330 may provide the request to the data layer 108. In turn, the cluster resources of the data layer 108 may retrieve the data table from the data storage system 110 and process records in the data table to perform the transaction operation. Updating the data file may include reading, writing, adding, deleting, modifying, moving, merging, re-organizing, etc. one or more data records in the data table. As described above, the data files that make up the data table are each associated with a deletion vector that includes a plurality of elements, and each element in the deletion vector may correspond to a record in the data file. Each element may include a value that is configured to indicate whether a corresponding record is deleted in the data file. In one embodiment, when records of a data file do not have any deletions, the data file may not have a deletion vector. Thus, in one instance, an empty deletion vector (i.e., no deletions in the corresponding data file) is represented by an absent deletion vector. The transaction module 330 may update the one or more records in the data file and/or update the corresponding elements in the deletion vector.

In some embodiments, the transaction module 330 is communicatively coupled to receive requests to perform transaction operations on the same data table from multiple users of client devices 116 that are authorized to perform these transactions. For example, a user of client device 116A may request to perform a compaction operation on a particular data table (e.g., consisting of data files A, B, C at version 2) and the transaction module 330 may provide this request to one or more cluster resources in the data layer 108. Another user of another client device 116B may request to perform a deletion operation of a subset of records on the same data table and the transaction module 330 may provide this request to one or more different cluster resources in the data layer 108. In such an instance, the data layer 108 processing a transaction operation may perform changes to the data table and request to commit the changes into the transaction log for the data table.

The concurrency management module 335 may receive one or more indications to commit transactions from the data layer 108. In some embodiments, the concurrency management module 335 receives commit requests in a sequential order, verifies the commits, and records the commits in the transaction log. For example, the concurrency management module 335 records information in the transaction log relating to a successful request (e.g., a new set of data files, timestamp of the commit, and the like). In some embodiments, the concurrency management module 335 may receive one or more indications to commit one or more concurrent transactions. Specifically, a current transaction may start processing a transaction operation on a respective version of the data table and one or more intervening transactions may have intervened prior to completion of the transaction operation. For example, the intervening transactions may have committed a successful version of the data table before the current transaction has had an opportunity to commit. These intervening transactions may also be referred to as winning transactions. The current transaction and the winning transactions collectively may be referred to as concurrent transactions.

In some embodiments, upon receiving indications to commit one or more concurrent transactions, the concurrency management module 335 determines a logical prerequisite of the concurrent transactions and a physical prerequisite of the data file. If both prerequisites (e.g., the logical prerequisite and the concurrent prerequisite) are satisfied, the current transaction can commit using the deletion vector associated with the data file. Responsive to determining that the concurrent transactions satisfy a logical prerequisite and a physical prerequisite, the concurrency management module 335 determines that the concurrent transactions are serializable and the second transaction can be committed. The transaction module 330 then commits the second transaction by updating the deletion vector of the data file to indicate deletion of the subset of data records of interest to the current transaction and adding any new files as required.

As described in detail below, in some example embodiments, the logical prerequisite is determined by reviewing whether any of the winning transactions have affected the subset of data records of interest to the current transaction from the version of the data table that the current transaction has read. In some embodiments, the physical prerequisite is satisfied when the current transaction can locate the subset of data records of interest in data files that have been committed by the winning transactions. In some embodiments, the physical prerequisite is satisfied when the subset of data records is determined to be located within the same data file from which the current transaction performed a read operation. In other embodiments, the physical prerequisite is satisfied if the data files have been modified by the winning transactions and the subset of data records of interest can be mapped to corresponding rows in the modified set of data files through, for example, use of record identifiers, physical addresses of the data records, and the like.

Figure 4:
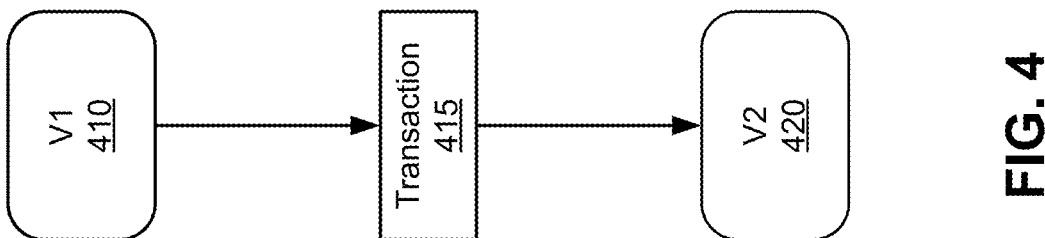
FIG. 4 illustrates an exemplary embodiment for using a deletion vector to commit a transaction on a data file, in accordance with an embodiment.

FIG. 4 illustrates an exemplary embodiment for using a deletion vector 450 to commit a transaction 415 on a data table that includes a data file 400, in accordance with some example embodiments. The data table may include a set of data files (e.g., data file 400). In some embodiments, each data file may be associated with a deletion vector comprising a plurality of elements (e.g., deletion vector 450). In some embodiments, the data file 400 may be initialized as a data table that includes one or more rows and/or one or more columns to store the plurality of records. As shown in FIG. 4. The data file 400 may include three records stored in three rows. Each record is associated with fields such as login account, whether the account has been successfully logged in (field: Login?), and a timestep of attempted login (field: Date). The data file 400 may be stored in a disk, memory, etc. of the data store 270 in the data storage system 110. In some embodiments, the data file 400 may be stored in the partitioned data store or the unpartitioned data store in the data store 270 of the data storage system 110. The location for storing the data file 400 in the data store 270 of the data storage system 110 may be referred to as the physical representation of the data file 400.

The transaction 415 transforms the data file 400 from a first version (V1) of the data table 410 to a second version (V2) of the data table 420. For example, the data file 400 is updated from the first version (V1) 410 to the second version (V2) 420. Updating a data file may include reading, writing, adding, deleting, modifying, moving, merging, re-organizing, etc. one or more data records in the data file.

In some embodiments, updating the data file 400 (e.g., by the transaction 415) does not change the data file 400. For example, the transaction 415 may be reading one or more records of the data file 400. As a result, the data file 400 in the first version (V1) 410 and the second version (V2) 420 would be the same.

In some embodiments, updating the data file 400 by executing the transaction 415, causes a change to the data file 400 in the first version (V1) 410, resulting in the second version (V2) 420 of the data file 400 being different than the first version (V1) 410 of the data file 400. For example, the transaction 415 may include performance of one or operations that cause changes to content of the first version (V1) 410 of the data file, such as by adding, deleting, and/or modifying the records. As another example, the transaction 415 may include operations such as moving, merging, and/or re-arranging the records, which causes changes in the physical representation of the data file 400.

When a transaction causes changes in the content of a data file, current systems delete the original data file and create a new data file to commit the transaction, (e.g., the second version (V2) 420 of the data file 400 is a new data file). In contrast to current systems, FIG. 4 shows use of a deletion vector 450 to indicate the changes between the first version (V1) 415 and the second version (V2) 420 of the data file. Through use of the deletion vector 450, the control layer 106 deletes the second row from the first version (V1) 410 of the data file 400 without rewriting the entire data file 400 to physically remove the deleted row. The control layer 106 stores the information (i.e., deleting the second row) in association with the data file including the rows of interest by using the deletion vector 450, which may be a type of metadata stored in the metadata store 275 of the data storage system 110. The deletion vector 450 includes one or more elements, and the value of each element indicates whether a corresponding row of record is deleted in the data file 400.

As shown in FIG. 4, the deletion vector includes 3 elements, each corresponding to each row of record in the data file 400. In the first version (V1) 410, the deletion vector 450 is (0, 0, 0), indicating an initial status of the data file 400. In the second version (V2) 420, the deletion vector 450 is (0, 1, 0), indicating that the second row of record has been deleted from the data file 400. In this way, when the transaction 415 commits, the data file 400 itself does not change. Rather, the control layer 106 checks the deletion vector 450 when committing subsequent transactions and uses the values to determine the changes to recreate the latest version of the data file 400. For example, the control layer 106 would identify the value 1 in the deletion vector 450, indicating that the second row has been deleted by a previous transaction. The control layer 106 then ignores the second row while reading the data file 400.

Changes in the content of the data file 400 may include adding rows, removing rows, and/or modifying the content of the records in the rows. When a transaction 415 is adding a new row of record, the data file 400 does not change, the deletion vector 450 does not update the values of the elements, and the new row of record may be stored as a new data file. When the transaction 415 is deleting a row of record, the data file 400 does not change, and the deletion vector 450 updates the value of the corresponding element, e.g., changing from 0 to 1, as shown in FIG. 4. When the transaction 415 is modifying the content in a row of record, the control layer 106 treats the transaction 415 as deleting the original row of record and adding a new row of the modified record. The physical representation of the data file 400 does not change, rather the control layer 106 updates the element in the deletion vector 450 corresponding to the row to indicate that the row of record is deleted, and adds a row of the modified record as a new data file.

Figure 5:
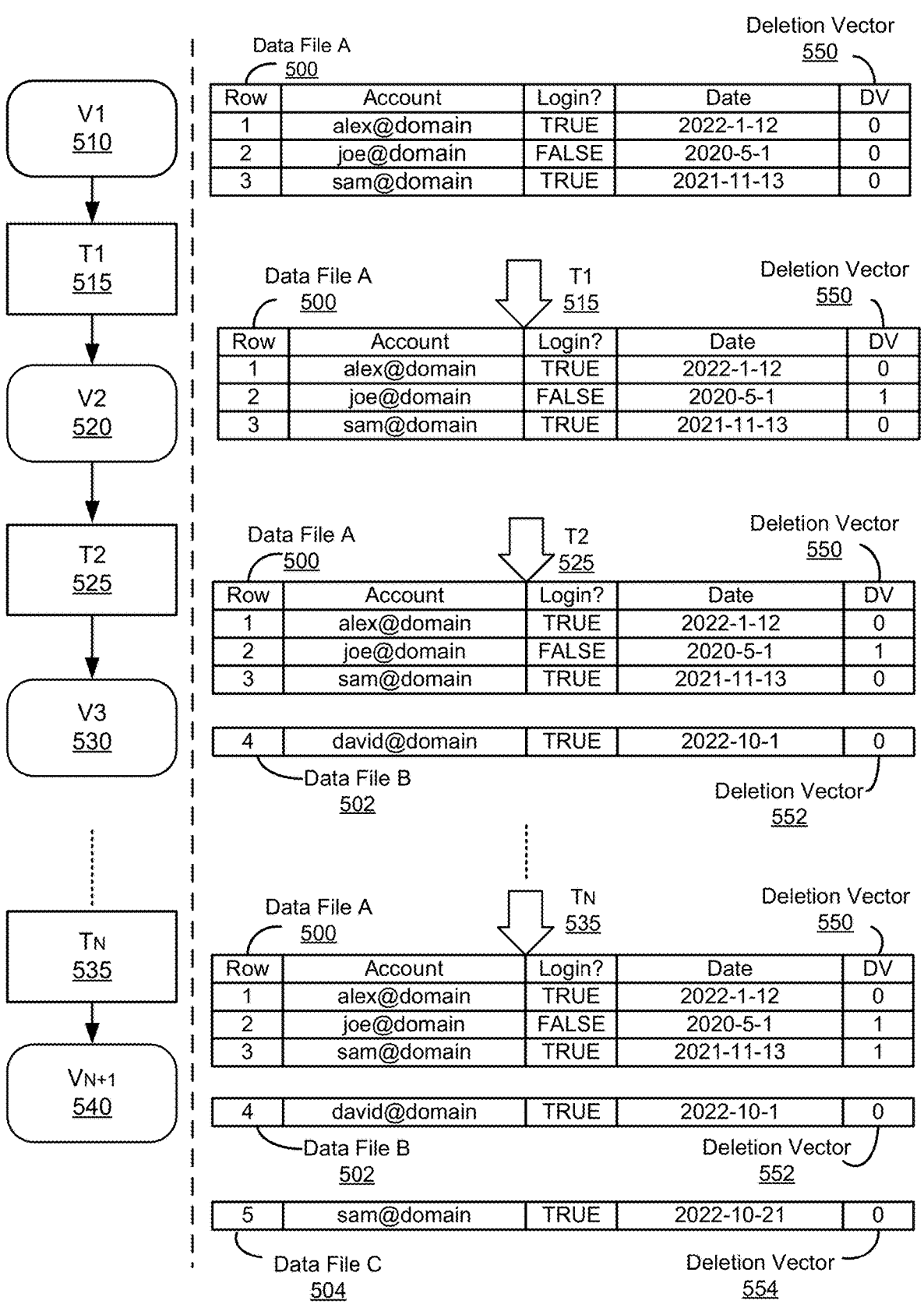
FIG. 5 illustrates an exemplary embodiment for committing a plurality of transactions in a sequential order using a deletion vector, in accordance with an embodiment.

FIG. 5 illustrates an exemplary embodiment for committing a plurality of transactions in a sequential order using a deletion vector, in accordance with an embodiment. As shown in FIG. 5, the plurality of transactions 515, 525, and 535 (i.e., T1, T2, . . . TN) are performed on a data file A 500 of a data table in a sequential order. The data file A 500 is associated with a deletion vector 550. The transactions 515, 525, and 535 (i.e., T1, T2, . . . TN) commit sequentially one by one. The first transaction (T1) 515 deletes the second row of record (i.e., the record associated with joe@domain) in the data file A 500 and transforms the data table from a first version (V1) of the data table 510 to a second version (V2) of the data table 520. As a result, in the second version (V2) 520, the data file A 500 remains the same and the associated deletion vector 550 updates the corresponding element from "0" to "1" to indicate this deletion. After the first transaction (T1) 515 commits, the control layer 106 starts to commit the second transaction (T2) 525. The second transaction (T2) 525 attempts to add a new row of record (i.e., the record associated with david@domain) to the data file A 500 and transforms the data table from the second version (V2) of the data table 520 to a third version (V3) of the data table 530. As a result, in the third version (V3) 530, the data file A 500 remains the same, the associated deletion vector 550 does not change, and a new data file B 502 comprising the new row of data is created with its associated deletion vector 552. After the second transaction (T2) 525 commits, the control layer 106 starts to commit the next transaction in the sequential order. Each transaction commits to transform the data table from a previous version to a new version.

The nth transaction (TN) 535 modifies the third row of record (i.e., the record associated with sam@domain) in the data file A 500 to change the content (i.e., "Date"). As a result, the data table transforms from the nth version (VN) to a (n+1)th version (VN+1) 540. In the (n+1)th version (VN+1) 540, the data file A 500 remains the same and the associated deletion vector 550 updates the corresponding element from "0" to "1" to indicate the deletion. The element of the deletion vector 550 that corresponds to "sam@domain" changes from "0" to "1." A new row of record corresponding to "sam@domain" with the modified "Date" is added as a new data file C 504 with its associated deletion vector 554. As the transaction (TN) 535 commits, the data file B 502 is not affected and remains the same with the same deletion vector 552.

Comparing the deletion vector 550 between the (n+1)th version and the first version, the total changes caused by the sequential transactions are indicated by the one or more elements of the deletion vector 550. Assuming the physical representation of the original data table does not change, to commit one or more sequential transactions on a data table, the control layer 106 may combine the updates in the deletion vector caused by each transaction in the sequential order to obtain the total changes. In this way, the final version of the data file is the original data file with the combined deletion vector.

Resolving Concurrent Transactions with Deletion Vectors

Figure 6A:
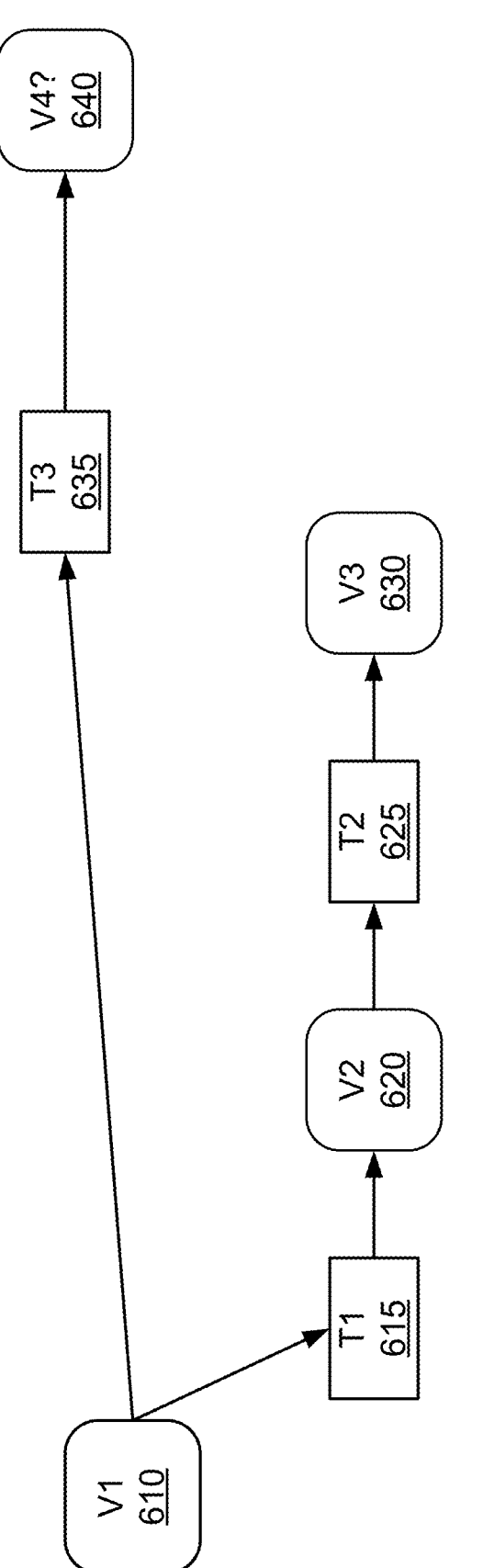
FIG. 6A illustrates an exemplary embodiment for committing one or more concurrent transactions, in accordance with an embodiment.

FIG. 6A illustrates an exemplary embodiment for committing one or more concurrent transactions, in accordance with some example embodiments. As shown in FIGS. 6, T1 (615) and T3 (635) are concurrent transactions which start while the data table is at the same version V1 (610). T1 (615) commits before T3 (635) commits, and commits a version of the data table from V1 (610) to V2 (620). Between two concurrent transactions, the transaction that commits first may be referred to as a "winning transaction," and the transaction that commits later may be referred to as a "current transaction" or a "losing transaction." In this case, T1 (615) is the winning transaction and T3 (635) is the current transaction. In some embodiments, one or more transactions may commit before the current transaction commits. For example, as shown in FIG. 6A, before T3 (635) commits, another transaction T2 (625) starts on the second version V2 (620) of the data table. T2 (625) commits before T3 (635) commits, and commits the data table from V2 (620) to V3 (630).

Transaction T3 (635) may or may not be running on the same computing device as T1 (615) or T2 (625) are running. The computing device running T3 (635) may or may not have knowledge about the execution of T1 (615) or T2 (625). T3 (635) is configured to transform the data table from V1 (610) to V4 (640), and T3 (635) may independently perform its own set of actions based on the original version V1 (610). However, after T1 (615) and T2 (625) commit, the data table becomes V3 (630), and T3 (635) is not performing on the current version of the data table. Current systems are programmed to delete the original data file and create a new data file to commit a transaction. In these types of instances, however, current systems are not able to locate the original data file to commit T3 (635) and, as a result would abort the transaction T3 (635).

Use of a deletion vector to commit concurrent transactions alleviates these issues, as the elements of the deletion vector are used to indicate whether a corresponding data record has been deleted and the original data file remains unchanged. Accordingly, the control layer 106 is able to determine whether the winning transaction would affect the current transaction. For example, the control layer 106 may inspect the changes caused by the winning transaction through use of the deletion vector, for example, by retrieving the change data in the metadata store associated with the winning transaction. If none of the changes of the winning transaction (such as, added or removed rows) would have affected the input that the current transaction used to determine its actions, then the current transaction can safely commit. In this case, the concurrent transactions are considered as to be serializable. That is, the concurrent transactions can commit as if they were executed one after the other in a sequential order, as the sequential transactions shown in FIG. 5.

In order to determine the serializability of the concurrent transactions, (e.g., whether the concurrent transactions are serializable), the control layer 106 determines whether a logical prerequisite of the concurrent transactions and a physical prerequisite of the data file are met.

A logical prerequisite can be that the winning transaction commits a version of the data table that does not include any change in the data content that would impact the subset of data records of interest to the current transaction. In some embodiments, the concurrency management module 335 determines whether the logical prerequisite for concurrent transactions are satisfied by reviewing whether any of the winning transactions have affected the subset of data records of interest to the current transaction. The subset of data records of interest can be defined as the subset of data records that are associated with one or more predicate filters for which the current transaction is interested in reading for the operation.

For example, the logical prerequisite may be satisfied if the winning transaction does not delete a row of record that the current transaction would update, delete, or read to determine its actions; if the winning transaction does not update a row of record that the current transaction would update, delete, or read to determine its actions; the winning transaction only reads the data records without deleting or modifying the data records, etc.

Alternatively, if the winning transaction deletes or updates a row of record from the data file and commits a newer version of the data file, and the current transaction is configured to update or delete the same row of record in the original version of the data file. In this case, the two concurrent transactions conflict and are considered as not satisfying the logical prerequisite. In another instance, if the winning transaction deletes one or more records from the data file, and the current transaction is configured to read or perform one or more actions based on the read operation, the two concurrent transactions would conflict and do not satisfy the logical prerequisite. For example, for a data file with a plurality of records for tax audit, if a winning transaction deleted a record and a current transaction was to mark every $29^{th}$ tax return record in ascending order of social security number (SSN) of the taxpayer, the two concurrent transactions would conflict, and the winning transaction would not satisfy the logical prerequisite. In another instance, if the winning transaction inserted a new record that the current transaction would have read and used to determine its actions, the two concurrent transactions would conflict and do not satisfy the logical prerequisite. Returning to the tax audit example, if a winning transaction inserted a new tax return record, the insertion operation would change which tax return records are marked for the current transaction, thus, the current transaction would abort.

In some embodiments, assuming the winning transaction updates or deletes a first set of data in the data file, and the current transaction is about to update, delete, or read a second set of data in the data file, then the logical prerequisite may be determined based on whether the first set of data overlaps with the second set of data. If the two sets of data do not overlap, then the winning transaction does not affect the current transaction logically, and the concurrent transactions satisfy a logical prerequisite.

The physical prerequisite can be that the current transaction can locate the subset of data records of interest in the data files of intermediate versions of data tables that have been committed by the winning transactions. In some embodiments, the physical prerequisite is determined based on the physical representation of the data file. For example, a current transaction attempting to modify a subset of data records in data file A reads from version V of the data table. A winning transaction may have committed a new version V+1 of the data file A using deletion vectors for the data file, but the physical representation of the data file A has not changed. The physical prerequisite is satisfied in this case because the location of the subset data records is still in the same data file A that the current transaction had read from version V.

As another example, the winning transaction commits at a new version of the data file, which may include location changes of one or more data records. For example, the winning transaction may move a data record from a first row to a second row. The physical representation of the first row of record changes between the original and the new versions of the data file. In this case, if the current transaction is configured to update the first row of record, the control layer 106 would not be able to identify the location of the first row of data when committing the current transaction, and thus the physical prerequisite would not be satisfied. Alternatively, if the current transaction does not include actions on the first row of record, even the physical representation of the first row of record changes, the winning transaction does not affect the current transaction, and the current transaction can commit. In some embodiments, the transactions may perform actions on a selected row of record in the data file; in some embodiments, the transactions may perform action on a selected field of record in the data file; and in some embodiments, the transactions may perform a combination of row, column, and/or field of record in the data file. For simplicity, examples of concurrent transactions perform actions on one or more selected rows of data record. Examples of concurrent transactions are illustrated in FIG. 6B and FIG. 6C.

In some instances, both the logical prerequisite and the physical prerequisite can be satisfied. For example, the winning transaction deletes a first row of data, and the current transaction attempts to delete a second row of data. In this type of situation, the winning transaction does not affect the current transaction either logically or physically, and the concurrent transactions are serializable. Accordingly, the current transaction can commit sequentially by using the deletion vector.

Figure 6B:
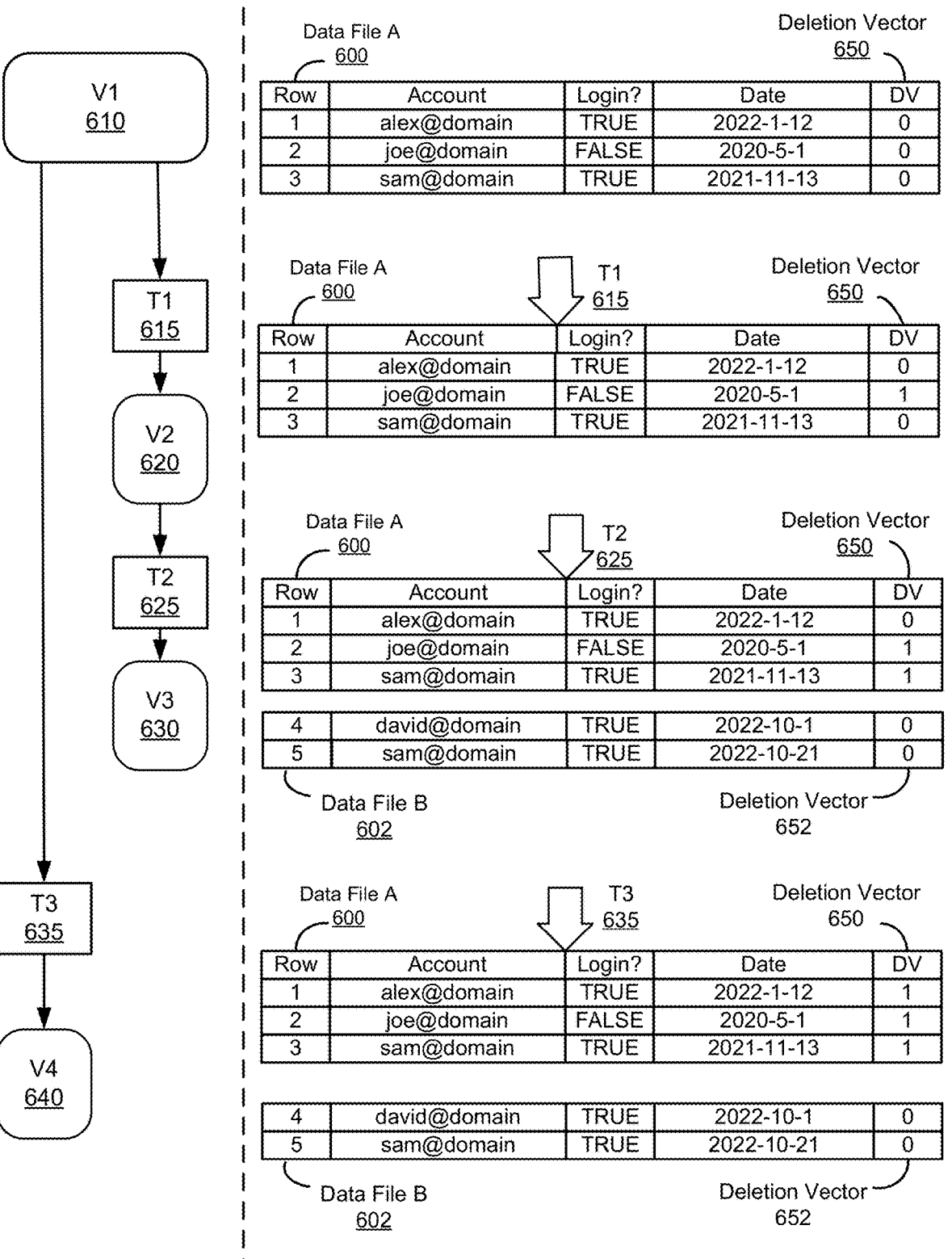
FIG. 6B illustrates another exemplary embodiment for committing one or more concurrent transactions, in accordance with an embodiment.
Figure 6C:
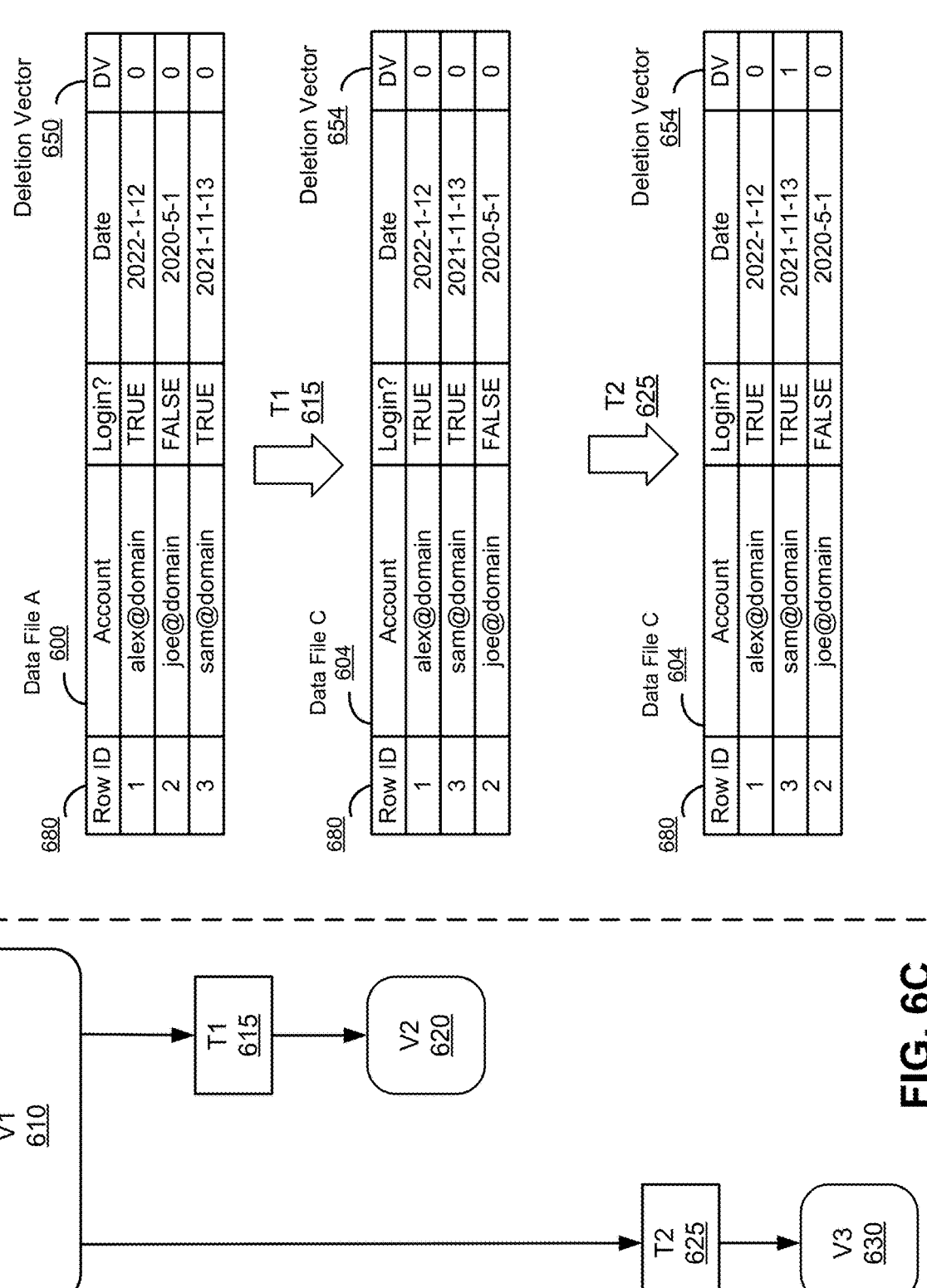
FIG. 6C illustrates another exemplary embodiment for committing one or more concurrent transactions, in accordance with an embodiment.

FIG. 6B illustrates another exemplary embodiment for committing one or more concurrent transactions, in accordance with some example embodiments. Similar to the example shown in FIG. 6A, T1 (615) and T3 (635) are concurrent transactions. T1 (615), the winning transaction, commits first, and commits the data table from the first version V1 (610) to the second version V2 (620). T1 (615) deletes the second row of data, associated with account "joe@domain," causing the deletion vector 650 to be updated such that the element corresponding to the second is modified from "0" to "1" at V1 (610). A second transaction T2 (625) starts to commit before T3 (635), and commits the second version V2 (620) to the third version V3 (630). The transaction T2 (625) modifies the third row of record, associated with account "sam@domain," and adds a new row of data, associated with "david@domain." Accordingly, the deletion vector 650 is updated to reflect the modification to the third row, and a new data file B 602 is added with its corresponding deletion vector 652. The first transaction T1 (615) and second transaction T2 (625) are sequential transactions, therefore, in the third version V3 (630), the data file A 600 remains the same, and the deletion vector 650 includes the combined updates of the corresponding elements.

After T1 (615) and T2 (625) commit, to commit T3 (635), the concurrency management module 335 determines the logical prerequisite of the concurrent transactions and the physical prerequisite for the data file A 600. As shown in FIG. 6B, the subset of data records of interest to the third transaction T3 (635) are those that have predicate "Account=alex@domain." The third transaction T3 is configured to delete the first row of data, associated with account "alex@domain." The changes made by T1 (615) and T2 (625) are associated with the second and the third row of record, and do not overlap with the first row which T3 (635) attempts to change. The winning transactions T1 (615) and T2 (625) do not change the content of the first row of record. Therefore, the concurrent transactions satisfy the logical prerequisite. Additionally, the winning transactions T1 (615) and T2 (625) do not change the location of the first row of record (e.g., move, merge, combine, etc., as such the first row of record is at the same location between the first, second and third version of the data table) so the physical representation of the first row of record does not change. Therefore, the concurrency management module 335 determines that the concurrent transactions are serializable, and commits the third transaction T3 (635) as if it is executed in a sequential order. In this way, the control layer 106 commits T3 (635) and creates a fourth version V4 (640), which includes a deletion vector 650 having the combined updates of the corresponding elements.

In some embodiments, the concurrent transactions satisfy a logical prerequisite, but the physical representation of the data file changes. For example, the winning transaction may move, merge, re-organize the rows of records, and the re-organized rows of data overlaps with the row of data that the current transaction attempts to update. In this case, even though the content of the data file does not change (e.g., the content remains logically equivalent), the physical representation of the data records changes. The concurrency management module 335 may not be able to determine the location of the row of data that the current transaction attempts to update and may have to abort the current transaction. Thus, in one embodiment, one or more identifiers, such as record identifiers, may be used to track the data records so that the concurrency management module 335 can identify the location of the data records to commit the current transaction.

FIG. 6C illustrates another exemplary embodiment for committing one or more concurrent transactions, in accordance with an embodiment. As shown in FIG. 6C, transactions T1 (615) and T2 (625) are concurrent transactions. T1 (615) commits first, thus is the winning transaction; and T2 (625) is to be committed later, thus is the current transaction. T1 (615) re-organizes data file A 600 and generates a new data file C 604. Thus, although the logical prerequisite is satisfied, the physical representation of the data file A 600 that T2 (625) attempts to read has changed. T2 (625) attempts to delete the original third row of record, associated with account "sam@domain" in the data file A 600, but without a record identifier, the concurrency management module 335 cannot identify the location of the data record of interest in the data files that have been committed by the winning transaction T1 (615).

Thus, in some embodiments, record identifiers, such as the row identifier 680, e.g., Row ID, is configured to identify each row of data records so that the locations of the data records can be tracked and identified as one or more newer versions of the data table are committed by winning transactions. As shown in FIG. 6C, the data record of "sam@domain" is identified with a Row ID 3. By reading the row identifier 680, Row ID 3, the concurrency management module 335 can identify that the data record of "sam@domain" was located at the third row in the data file A 600 and now is located at the second row in the data file C 604. In this way, even though the physical representation of the data files has changed due to winning transactions that have committed before the current transaction T2 (625), the concurrency management module 335 can commit T2 (625) on the data file C 604 by updating the associated deletion vector 654. While FIG. 6C illustrates an example winning transaction in which the records in data file A 600 to new data file C 604, the use of row identifiers to locate records may also be generalized to cases where the winning transaction redistributes data in one data file across multiple data files.

In another embodiment, the locations of the data records can be tracked and identified as one or more newer versions of the data table are committed by winning transactions by having the transactions that reorganize data store, as part of the metadata, mapping information that indicates how the transaction moved and redistributed the records around in the transaction. In one instance, in the case of a compaction operation, the mapping information may indicate that the records in data files A and B were combined into a new data file C. For example, data files C may include the records of data file A concatenated subsequently with the records of data file B, such that the rows of data files A and B can be located in new data file C, since they are concatenated together in the same order. In another instance, the mapping information may indicate separate mapping information for each record.

While maintaining a separate record identifier for data records of a data table may require more memory and management by the data processing service 102, it may be advantageous to do so especially when the current transaction has already processed a significant amount of data and the winning transactions have not changed the data for the subset of data records of interest to the current transaction. In these situations, even though the physical representations of the data files might have changed, the concurrency management module 335 may still be able to commit the current transaction to a new version of the data table, such that the current transaction does not have to start over again and waste computing resources.

In some embodiments, the physical representation of the data file does not change but the logical prerequisite of the concurrent transactions is not satisfied. For example, the winning transaction deletes a first row of data, and the current transaction attempts to update the first row of data. Because of the deletion vector, the physical representation of the data file does not change although the first row of data is deleted, however, the winning transaction commits at a version of the data table that includes a change in the data content that would impact the current transaction to commit. The concurrent transactions therefore do not satisfy the logical prerequisite, and the current transaction cannot commit.

FIG. 7 is a flowchart of a method for committing one or more concurrent transactions, in accordance with an embodiment. The process shown in FIG. 7 may be performed by one or more components (e.g., the control layer 106 or the concurrency management module 335) of a data processing system/service (e.g., the data processing service 102). Other entities may perform some or all of the steps in FIG. 7. The data processing service as well as the other entities may include some or of the component of the machine (e.g., computer system) described with FIG. 8. Embodiments may include different and/or additional steps, or perform the steps in different orders.

The control layer 106 accesses 702 a plurality of records included in a data table at a first version. The data table may be stored in a data storage system 110 and accessed by the control layer 106 upon request of a transaction operation. The data table includes a first set of data files, and each data file is associated with a deletion vector that includes a plurality of elements. Each element may correspond to a data record in the data file, e.g., a row of record in a data table. Each element may include a value that is configured to indicate whether a corresponding record is deleted in the data file. For example, an element in a deletion vector having a value of "1" may indicate the corresponding row of record is deleted; alternatively, the element in the deletion vector having a value of "0" may indicate the corresponding row of record is not changed. In some embodiments, the data file may include partitioned and/or unpartitioned data records.

The control layer 106 receives 704 a first indication that a first transaction is committed. The first transaction commits the data table from the first version to a second version, and updates a first subset of records in the data table. Updating the first subset of records may include reading, writing, adding, deleting, modifying, moving, merging, reorganizing, etc. the first subset of records. In some embodiments, updating (e.g., reading) the first subset of records does not change the first subset of records. Alternatively, updating the first subset of records may cause a change to the first subset of records, including changing the content of the first subset of records and/or changing a physical representation of the first subset of records. Updating the first subset of records in the data table at the first version may be associated with updating a first subset of elements in the deletion vector.

The control layer 106 receives 706 a second indication to commit a second transaction to update a second subset of records in a data file of the data table at the first version. The second transaction is a concurrent transaction of the first transaction. Both transactions attempt to updates one or more records in the data table, while the first transaction commits first (e.g., winning transaction), the control layer 106 needs to determine whether the second transaction (e.g., current transaction) can be committed.

The control layer 106 determines 708 a logical prerequisite of the concurrent transactions based on whether the first subset of records changes content of one or more records in the second subset of records. If the first subset of elements in the deletion vector is not associated with the one or more records in the second subset of records, the first subset of records does not change the content of the one or more records in the second subset of records, and the concurrent transactions satisfy the logical prerequisite.

The control layer 106 determines 710 a physical prerequisite for the concurrent transactions that indicates whether the second subset of records can be located in data files committed by the first transaction. For example, if the first transaction does not change the physical representation of the data file including the second subset of records, and the second subset of records can be located in the second version of the data table using the same way as in the first version of the data table, the physical prerequisite may be satisfied. In another instance, even if the physical representation of the data file has changed, the physical prerequisite can be satisfied using record identifiers such that the second subset of records can be mapped to respective records in an updated set of data files committed by a winning transaction.

The control layer 106 commits 712 the second transaction to generate a third version of the data table based on the logical prerequisite and the physical prerequisite being satisfied. The third version of the data table may be associated with an updated deletion vector. The update deletion vector may update the values of one or more elements, indicating a change from the first version of the data table to the third version of the data table.

Figure 8:
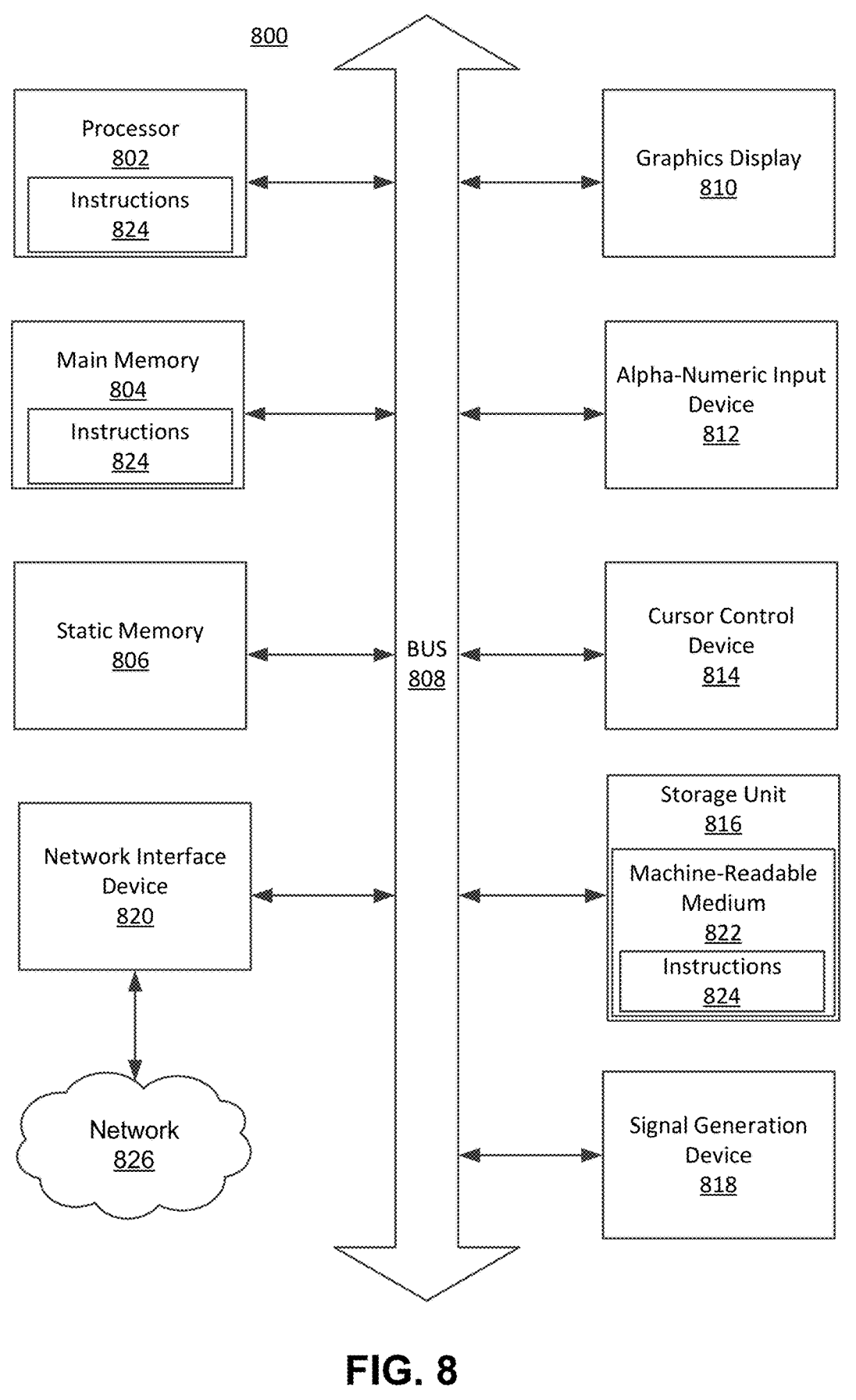

Turning now to FIG. 8, illustrated is an example machine to read and execute computer readable instructions, in accordance with an embodiment. Specifically, FIG. 8 shows a diagrammatic representation of the data processing service 102 (and/or data processing system) in the example form of a computer system 800. The computer system 800 can be used to execute instructions 824 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 824 (sequential or otherwise) that specify actions to be taken by that machine. Further, while only a single machine is illustrated, the term "machine" shall also be taken to include any collection of machines that individually or jointly execute instructions 824 to perform any one or more of the methodologies discussed herein.

The example computer system 800 includes one or more processing units (generally processor 802). The processor 802 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The processor executes an operating system for the computing system 800. The computer system 800 also includes a main memory 804. The computer system may include a storage unit 816. The processor 802, memory 804, and the storage unit 816 communicate via a bus 808.

In addition, the computer system 800 can include a static memory 806, a graphics display 810 (e.g., to drive a plasma display panel (PDP), a liquid crystal display (LCD), or a projector). The computer system 800 may also include alphanumeric input device 812 (e.g., a keyboard), a cursor control device 814 (e.g., a mouse, a trackball, a joystick, a motion sensor, or other pointing instrument), a signal generation device 818 (e.g., a speaker), and a network interface device 820, which also are configured to communicate via the bus 808.

The storage unit 816 includes a machine-readable medium 822 on which is stored instructions 824 (e.g., software) embodying any one or more of the methodologies or functions described herein. For example, the instructions 824 may include instructions for implementing the functionalities of the transaction module 330 and/or the concurrent management module 225. The instructions 824 may also reside, completely or at least partially, within the main memory 804 or within the processor 802 (e.g., within a processor's cache memory) during execution thereof by the computer system 800, the main memory 804 and the processor 802 also constituting machine-readable media. The instructions 824 may be transmitted or received over a network 826, such as the network 120, via the network interface device 820.

While machine-readable medium 822 is shown in an example embodiment to be a single medium, the term "machine-readable medium" should be taken to include a single medium or multiple media (e.g., a centralized or distributed database, or associated caches and servers) able to store the instructions 824. The term "machine-readable medium" shall also be taken to include any medium that is capable of storing instructions 824 for execution by the machine and that cause the machine to perform any one or more of the methodologies disclosed herein. The term "machine-readable medium" includes, but not be limited to, data repositories in the form of solid-state memories, optical media, and magnetic media.

ADDITIONAL CONFIGURATION CONSIDERATIONS

The disclosed configurations beneficially provide a method (and/or a system) for resolving concurrent transactions using deletion vectors. Without deletion vectors, concurrent transactions may fail to commit due to the conflicts introduced by intervening transactions, and the current transaction typically will have to start over from the most current version of the data table, resulting in wasted computing resources and time. By resolving concurrent conflicts in conjunction with deletion vectors associated with data files, the method presented herein may determine the serializability of the concurrent transactions and prevent many transaction operations from failing and having to be started over again, saving resources and cost for both the data processing service and the users of the data processing service.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for improving training data of a machine learning model through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined herein.

What is claimed is:

1. A method comprising:

receiving, from a client device, a request to read records in a data table, the data table being associated with a deletion vector, wherein the deletion vector is a metadata structure stored in association with the data table, and wherein each value in the deletion vector corresponds to a relative one of the records in the data table;

identifying a first value in the deletion vector corresponding to a first record in the data table;

determining that the first value indicates that the first record has been deleted based on a previously executed transaction to the data table;

returning, to the client device, a subset of the records in the data table based on determining that the first value indicates that the first record has been deleted, the subset of records not including the first record;

receiving a concurrent request to generate an updated version of the data table, the updated version of the data table including a modification to at least one existing record in the data table;

determining the at least one existing record for the updated version of the data table can be located in at least a subset of data files of the data table;

responsive to determining that the records can be located, updating a value in the deletion vector corresponding to the at least one existing record in the data table to indicate that the at least one existing record is deleted; and committing the updated version of the data table to a metadata log file.

2. The method of claim 1, further comprising:

receiving a request to modify a second record in the data table;

generating a new record in the data table that includes a modification to the second record;

updating a value in the deletion vector corresponding to the second record to indicate that the second record has been deleted; and adding a new value to the deletion vector corresponding to the new record, the new value indicating that the new record has not been deleted.

3. The method of claim 2, further comprising:

receiving a subsequent request to read records in the data table;

determining that the value corresponding to the second record indicates that the second record has been deleted based on the modification to the second data record; and returning a subsequent subset of the records in the data table based on determining that the value corresponding to the second record indicates that the second record has been deleted, the subsequent subset of records not including the second record.

4. The method of claim 1, further comprising:

identifying a second value in the deletion vector corresponding to a second record in the data table; and determining that the second value indicates that the second record has not been deleted, wherein the subset of the records in the data table includes the second record.

5. The method of claim 1, further comprising:

determining that a logical prerequisite of the concurrent request is satisfied;

determining that records that a physical prerequisite of the concurrent request is satisfied; and committing the concurrent request to generate the updated version of the data table based on determining that the logical prerequisite of the concurrent request and the physical prerequisite of the concurrent request are satisfied.

6. The method of claim 5, wherein determining that the logical prerequisite of the concurrent request is satisfied comprises:

determining, based on values in the deletion vector corresponding to records in the updated version of the data table, that the records in the updated version of the data table have not been deleted based on the previously executed transaction to the data table.

7. A system comprising:

one or more computer processors; and one or more computer-readable mediums storing instructions that, when executed by the one or more computer processors, cause the system to perform operations comprising:

receiving, from a client device, a request to read records in a data table, the data table being associated with a deletion vector, wherein the deletion vector is a metadata structure stored in association with the data table, and wherein each value in the deletion vector corresponds to a relative one of the records in the data table;

identifying a first value in the deletion vector corresponding to a first record in the data table;

determining that the first value indicates that the first record has been deleted based on a previously executed transaction to the data table;

returning, to the client device, a subset of the records in the data table based on determining that the first value indicates that the first record has been deleted, the subset of records not including the first record;

receiving a concurrent request to generate an updated version of the data table, the updated version of the data table including a modification to at least one existing record in the data table;

determining the at least one existing record for the updated version of the data table can be located in at least a subset of data files of the data table;

responsive to determining that the records can be located, updating a value in the deletion vector corresponding to the at least one existing record in the data table to indicate that the at least one existing record is deleted; and committing the updated version of the data table to a metadata log file.

8. The system of claim 7, wherein the operations further comprise:

receiving a request to modify a second record in the data table;

generating a new record in the data table that includes a modification to the second record;

updating a value in the deletion vector corresponding to the second record to indicate that the second record has been deleted; and adding a new value to the deletion vector corresponding to the new record, the new value indicating that the new record has not been deleted.

9. The system of claim 8, wherein the operations further comprise:

receiving a subsequent request to read records in the data table;

determining that the value corresponding to the second record indicates that the second record has been deleted based on the modification to the second data record; and returning a subsequent subset of the records in the data table based on determining that the value corresponding to the second record indicates that the second record has been deleted, the subsequent subset of records not including the second record.

10. The system of claim 7, wherein the operations further comprise:

identifying a second value in the deletion vector corresponding to a second record in the data table; and determining that the second value indicates that the second record has not been deleted, wherein the subset of the records in the data table includes the second record.

11. The system of claim 7, wherein the operations further comprise:

determining that a logical prerequisite of the concurrent request is satisfied;

determining that records that a physical prerequisite of the concurrent request is satisfied; and committing the concurrent request to generate the updated version of the data table based on determining that the logical prerequisite of the concurrent request and the physical prerequisite of the concurrent request are satisfied.

12. The system of claim 11, wherein determining that the logical prerequisite of the concurrent request is satisfied comprises:

determining, based on values in the deletion vector corresponding to records in the updated version of the data table, that the records in the updated version of the data table have not been deleted based on the previously executed transaction to the data table.

13. A non-transitory computer-readable medium storing instructions that, when executed by one or more computer processors of a computing system, cause the computing system to perform operations comprising:

receiving, from a client device, a request to read records in a data table, the data table being associated with a deletion vector, wherein the deletion vector is a metadata structure stored in association with the data table, and wherein each value in the deletion vector corresponds to a relative one of the records in the data table;

identifying a first value in the deletion vector corresponding to a first record in the data table;

determining that the first value indicates that the first record has been deleted based on a previously executed transaction to the data table;

returning, to the client device, a subset of the records in the data table based on determining that the first value indicates that the first record has been deleted, the subset of records not including the first record;

receiving a concurrent request to generate an updated version of the data table, the updated version of the data table including a modification to at least one existing record in the data table;

determining the at least one existing record for the updated version of the data table can be located in at least a subset of data files of the data table;

responsive to determining that the records can be located, updating a value in the deletion vector corresponding to the at least one existing record in the data table to indicate that the at least one existing record is deleted; and committing the updated version of the data table to a metadata log file.

14. The non-transitory computer-readable medium of claim 13, wherein the operations further comprise:

receiving a request to modify a second record in the data table;

generating a new record in the data table that includes a modification to the second record;

updating a value in the deletion vector corresponding to the second record to indicate that the second record has been deleted; and adding a new value to the deletion vector corresponding to the new record, the new value indicating that the new record has not been deleted.

15. The non-transitory computer-readable medium of claim 14, wherein the operations further comprise:

receiving a subsequent request to read records in the data table;

determining that the value corresponding to the second record indicates that the second record has been deleted based on the modification to the second data record; and returning a subsequent subset of the records in the data table based on determining that the value corresponding to the second record indicates that the second record has been deleted, the subsequent subset of records not including the second record.

16. The non-transitory computer-readable medium of claim 13, wherein the operations further comprise:

identifying a second value in the deletion vector corresponding to a second record in the data table;

determining that the second value indicates that the second record has not been deleted, wherein the subset of the records in the data table includes the second record.

17. The non-transitory computer-readable medium of claim 13, wherein the operations further comprise:

determining that a logical prerequisite of the concurrent request is satisfied;

determining that records that a physical prerequisite of the concurrent request is satisfied; and committing the concurrent request to generate the updated version of the data table based on determining that the logical prerequisite of the concurrent request and the physical prerequisite of the concurrent request are satisfied.

18. The non-transitory computer-readable medium of claim 17, wherein:

determining that the logical prerequisite of the concurrent request is satisfied comprises determining, based on values in the deletion vector corresponding to records in the updated version of the data table, that the records in the updated version of the data table have not been deleted based on the previously executed transaction to the data table.

\* \* \* \* \*